United States Patent Office 2,855,319
Patented Oct. 7, 1958

2,855,319

ASPHALTIC PAVING COMPOSITION

Kenneth E. McConnaughay, Lafayette, Ind.

No Drawing. Application August 9, 1954
Serial No. 448,767

8 Claims. (Cl. 106—123)

This invention relates to paving compositions formed as mixtures of aggregate and bituminous emulsions. One feature of bituminous pavements frequently regarded as objectionable is their tendency to soften in hot weather. There are hard asphalts which are not objectionably soft in hot weather; but all such asphalts of which I am aware are objectionably hard at low temperatures.

It is therefore an object of this invention to increase the temperature range throughout which an asphalt will possess satisfactory hardness properties. Another object is to modify an asphalt emulsion in such a way as to effect a very material increase in the high- temperature hardness of a pavement produced from it without adversely affecting the hardness at low temperatures. Still another object of the invention is to produce a bituminous paving composition which, especially immediately after preparation, will exhibit an improved resistance to water.

I have discovered that by proper selection of an emulsifying agent used in preparing an asphalt emulsion, and by proper selection of proportions, the high-temperature hardness of the emulsion residue can be increased substantially without adversely affecting the properties of the residue at low temperatures. The emulsifying agent most satisfactory in this respect is a tall-oil soap. Tall oil is a by-product of the process of manufacturing kraft paper, in which process pine wood is digested with caustic soda and sodium sulphide. When the waste liquids from such digestion, which contain sodium soaps of rosin and fatty acids, are concentrated by evaporation, the soaps coagulate into a superficial layer which is skimmed from the liquid and acidified with sulphuric acid to liberate a mixture of rosin acids and fatty acids constituting crude tall oil.

In producing an asphalt emulsion using a tall-oil soap as an emulsifying agent, the asphalt may be heated to decrease its viscosity and mixed with tall oil, and the resulting mixture passed through a dispersing mill together with a hot water solution of an alkali such as caustic soda or caustic potash. The alkali saponifies the tall oil to form a soap serving as an emulsifying agent promoting dispersion of the asphalt in the water. Alternatively, the tall oil can be saponified with an aqueous solution of alkali and the resulting soap solution added to the asphalt. In laying a pavement with the aid of such an emulsion the emulsion may be applied to aggregate and the coated aggregate then spread and compacted, or the aggregate may be spread prior to application of the emulsion to it.

The tall-oil component of the emulsifying agent may be either crude tall oil, tall oil refined by the acid process or by distillation, tall-oil pitches, tall-oil esters, or mixtures of such substances.

The proportion of tall-oil soap used in an emulsion will depend upon the nature of the asphalt and the characteristics which the emulsion residue is to possess. If crude tall oil is employed in making the emulsion, its content will, in most cases, be from two to four percent based on the weight of the asphalt. Refined tall oils, pitches, or esters would be used in quantities sufficient to produce equivalent proportions of soap. Where close control is desired, I may determine the optimum content by subjecting the emulsion residue to a float test. The float test, which is a well known test (see A. S. T. M. Specification D–139–27) for determining the characteristics of bituminous materials involves using a quantity of the material being tested as a plug of standard dimensions in the bottom of a metallic dish which floats on the surface of a water bath maintained at predetermined temperature. If the dish and plug have a predetermined temperature, usually 41° F., when introduced into the water bath, the time required for the water to break through the plug is a measure of the hardness of the asphalt at the temperature of the bath. I prefer to conduct the float test at a temperature of 140° F., which is substantially higher than the temperature employed in the standard test above referred to, and to control the tall-oil content of the emulsion in such a manner as to insure that the residue plug will remain intact for at least 800 seconds and preferably for 1200 seconds. In some cases the quantity of tall oil necessary to attain this result is about 1½% based on the weight of the asphalt; but for practical purposes, I prefer to use at least 2% of tall oil. The high-temperature hardness of the residue continues to increase as the tall-oil percentage increases; but for economic reasons, tall oil-contents of greater than 10% are not indicated, and I would rarely use more than 4% of tall oil based on weight of the asphalt.

The percentage of alkali employed to saponify the tall oil will depend both upon the nature of the alkali and, to some extent, upon the characteristics desired for the emulsion residue. The economically practical alkalies are caustic soda and caustic potash. If caustic soda is used, its proportions may be 10% to 30% based on the weight of tall oil, but if caustic potash is used, such percentage may be 15% to 45%. Generally speaking, the resistance of the emulsion residue to water will increase with a decrease in the alkali content of the emulsion, while resistance to petroleum oils will increase with an increase in alkali content of the emulsion. For most purposes, I employ about 14% of caustic soda or 21% caustic potash, based on the weight of the tall oil. As low as 6% of caustic soda may be used to partially saponify the tall oil as long as an emulsion is obtained.

As a specific example of an emulsion embodying my invention, I cite the following:

| | Percent |
|---|---|
| Asphalt of 150 penetration (A. S. T. M. Specification D–5–25) | 60. |
| Crude tall oil | 1.8 |
| Caustic soda | 0.25 |
| Water | 37.95 |

As noted above, the composition is subject to considerable variation. The tall-oil percentage, based on the weight of the asphalt, may depart from the 3% in the example to as little as 1½% or to as much as 10%; but ordinarily tall-oil percentages greater than about 4% based upon the weight of the asphalt would not be used. The percentage of alkali embodied in the emulsion will vary with the percentage of tall oil; but, again as indicated above, there may be a substantial variation in the relative proportions of tall oil and alkali.

The asphalt used may vary widely in hardness, and may be either a pure asphalt, a mixture of asphalts, or a cut-back asphalt, depending largely on the characteristics desired for the finished pavement. For example, the asphalt in the above specific example could be replaced with a mixture of equal parts of the same asphalt and kerosene. The increase in high-temperature hardness resulting from the use of tall-oil soap as an emulsifying agent and in the range of percentages above indicated occurs with all types of asphalts that I have tested.

A peculiar characteristic of the residues of emulsions embodying tall oil is that while they harden asphalts at high temperatures they have a softening effect at low and intermediate temperatures. In other words, their inclusion in proper proportions reduces the temperature susceptibility of the asphalt to which they are added. This fact will be evident from the following table, which shows the results of various tests performed on three different bituminous materials—namely, a base asphalt (designated "A"), a residue (designated "B") of an emulsion of that asphalt with 2% tall oil and 0.28% caustic soda, and a residue (designated "C") of an emulsion of the same base asphalt with 3% tall oil and 0.42% caustic soda:

| Softening point by ball and ring test | A | B | C |
|---|---|---|---|
| (A. S. T. M. Specification D 36-26) | 105° F | 129° F | |
| Penetration at 77° F. (Note 1) | 164 mm | 146 mm | 139 mm |
| Penetration at 32° F. (Note 1) | 15 mm | 21 mm | 23 mm |
| Penetration at 140° F. (Note 2) | 208 mm | 36 mm | 14 mm |
| Float test at 140° F | 175 sec | 1,200+sec | 1,200+sec |

NOTE 1.—Penetration determined with needle and other conditions of A. S. T. M., D 5-25.
NOTE 2.—Penetration determined by same procedure except for use of a cylindrical, blunt-ended needle one inch in diameter.

Bearing tests on complete paving compositions—i. e., compacted mixtures of asphalt emulsion and aggregate—show that the use of tall-oil soap above certain percentages as an emulsifying agent increases the bearing strength of the composition at ordinary and elevated temperatures. This increase in strength appears in significant degree when the emulsion-residue is capable of withstanding a temperature of 140° F. for more than 800 seconds as determined by the aforesaid float test. Usually, about 2% of tall-oil soap will provide the desired high-temperature hardness.

The more common forms of emulsifying agents, such as oleic acid, Vinsol, FF wood rosin, and B-rosin, if capable of increasing high-temperature hardness at all, do so to only a limited extent. Used with tall oil soaps such substances tend to decrease high-temperature hardness, but they may be used in small quantities as stabilizers so long as their softening effect, as determined by the float test, is not too great.

The same increase in high-temperature hardness which characterizes the residues of oil-in-water emulsions containing an adequate quantity of tall-oil soap is possessed by asphalts, cut-back asphalts and the residues of inverted emulsions to which a dehydrated tall-oil soap has been added. As in the case of emulsion residues, the increased strength of such asphalts and cut-back asphalts at high temperatures is not accompanied by any untoward effects, such as an objectionable increase in hardness, at low temperatures.

One of the objectionable characteristics of many prior asphaltic emulsions is that they possess low resistance to water prior to the time when they have completely broken. Rain, or water from other sources, coming in contact with freshly prepared paving compositions embodying such emulsions tends to wash the emulsion from the aggregate. In contrast, in paving compositions prepared with emulsions embodying my invention, the emulsion coating on the aggregate particles is immediately stable and highly resistant to water.

By reducing the temperature-susceptibility of asphalts and other bituminous aggregate-coating materials, my invention makes it generally possible to select a bituminous binder with regard to its hardness at ordinary and low temperatures and makes it unnecessary to compromise, at the expense of low-temperature properties, in order to obtain satisfactory high-temperature hardness.

I claim as my invention:

1. An asphaltic paving composition, comprising a mixture of aggregate and an asphaltic material containing a water-soluble tall-oil soap as an emulsifying agent in a proportion of from about two percent to about eight percent based on the asphalt.

2. An asphaltic emulsion for use in a paving composition, comprising water as the continuous phase, asphalt as the dispersed phase, and a water-soluble tall-oil soap as an emulsifying agent in a proportion of from about two percent to about eight percent based on the asphalt.

3. An emulsion as set forth in claim 2 with the addition that said bitumen is an asphalt.

4. An emulsion as set forth in claim 3 with the addition that the asphalt is a cut-back asphalt.

5. An emulsion as set forth in claim 2 with the addition that the emulsion has the water as its continuous phase.

6. An emulsion as set forth in claim 2 with the addition that the emulsion has the oil as its continuous phase.

7. A paving composition having a bituminous binder, comprising a bitumen and a water-soluble tall-oil soap, said bitumen alone having at 140° F. a hardness of materially less than 800 seconds as measured by the float-test and said tall-oil soap being present in quantity sufficient to raise the hardness of the entire binder at 140° F. to over 800 seconds as measured by said float test.

8. A paving composition as set forth in claim 7 with the addition that said binder is the residue of an asphaltic emulsion.

References Cited in the file of this patent

UNITED STATES PATENTS

| 2,326,610 | Borglin | Aug. 10, 1943 |
| 2,411,336 | Pearson | Nov. 26, 1946 |
| 2,411,634 | Pearson | Nov. 26, 1946 |
| 2,412,526 | McCoy | Dec. 10, 1946 |
| 2,430,998 | Schmidl | Nov. 18, 1947 |
| 2,431,891 | Rosencranse | Dec. 2, 1947 |
| 2,585,336 | McCoy | Feb. 12, 1952 |
| 2,679,462 | Monson | May 25, 1954 |

FOREIGN PATENTS

| 683,170 | Great Britain | Nov. 26, 1952 |